United States Patent [19]
Boll et al.

[11] Patent Number: 5,712,550
[45] Date of Patent: Jan. 27, 1998

[54] APPARATUS FOR CONTROLLING A POWER CONTROL ELEMENT OF A DRIVE UNIT OF A MOTOR VEHICLE

[75] Inventors: Leonhard Boll, Eberdingen; Thomas Zeller, Ditzingen; Klaus Müller, Asperg, all of Germany

[73] Assignee: Robert Bosch GmbH, Stuttgart, Germany

[21] Appl. No.: 596,345

[22] PCT Filed: Jul. 23, 1994

[86] PCT No.: PCT/DE94/00858

§ 371 Date: Feb. 15, 1996

§ 102(e) Date: Feb. 15, 1996

[87] PCT Pub. No.: WO95/05704

PCT Pub. Date: Feb. 23, 1995

[30] Foreign Application Priority Data

Aug. 16, 1993 [DE] Germany .................. 43 27 483.8

[51] Int. Cl.⁶ .................................................. H02K 17/32
[52] U.S. Cl. .................. 318/434; 318/257; 318/599; 363/58; 361/24
[58] Field of Search ................. 318/257, 798–815, 318/434, 293, 599; 363/58, 41, 98; 361/24, 23, 78, 79, 33, 30

[56] References Cited

U.S. PATENT DOCUMENTS

| | | | |
|---|---|---|---|
| 4,703,238 | 10/1987 | Palmin et al. | |
| 4,794,312 | 12/1988 | Kano et al. | 318/599 |
| 4,901,366 | 2/1990 | Röttger. | |
| 4,951,188 | 8/1990 | Peter et al. | |
| 4,985,666 | 1/1991 | Nakabayshi | 318/434 |
| 5,111,123 | 5/1992 | Hach et al. | 318/434 |
| 5,111,378 | 5/1992 | Nowak et al. | 363/98 |
| 5,264,767 | 11/1993 | Chin et al. | |
| 5,457,364 | 10/1995 | Bilotti et al. | 318/811 X |

OTHER PUBLICATIONS

"Gleichstrommotoren kostenoptimiert gesteuert" by Herbert Sax, Elektronik, vol. 40, No. 15, Oct. 1991, Munchen, DE, pp. 106 to 109.

*Primary Examiner*—Karen Masih
*Attorney, Agent, or Firm*—Walter Ottesen

[57] ABSTRACT

An arrangement for driving a power control element of a drive unit of a motor vehicle is proposed and the arrangement has a full-bridge output stage. A direct-current motor is arranged in the bridge diagonal and the current through the direct-current motor is limited to at least one preadjusted value in that the clocked drive signals are interrupted when the preadjusted value is exceeded.

11 Claims, 3 Drawing Sheets

5,712,550

APPARATUS FOR CONTROLLING A POWER CONTROL ELEMENT OF A DRIVE UNIT OF A MOTOR VEHICLE

FIELD OF THE INVENTION

The invention relates to an arrangement for controlling a power control element of a drive unit of a motor vehicle.

BACKGROUND OF THE INVENTION

Such an arrangement is known form U.S. Pat. No. 4,951, 188. There, a full-bridge circuit is provided for controlling a power control element, especially a throttle flap in the context of an electronic accelerator pedal system. The full-bridge circuit comprises four actuable circuit elements which can be driven by at least one pulse-shaped drive signal. The consumer, the electric motor, is arranged in the bridge diagonal and is connected to the power control element. Two diagonally opposite lying switch elements are closed for actuating the motor in a first direction of rotation in the sense of opening the power control element. The two other diagonally opposite lying switch elements are actuated when actuating in the second direction. The so-called free-running phase is in contrast to these current flow phases in which the drive signal exhibits an active level. In the free-running phase, the drive signal exhibits an inactive level and none of the switch elements is driven. A mean current is generated by the consumer because of the clocked driving of the power control element and the clocked control comprises the current flow phase and the free-running phase. The mean current holds the consumer against a return force in the position pregiven by the electronic accelerator pedal system.

In order to protect the output stage against short circuits, a measuring resistor in the region of the ground connection of the full bridge detects the total current flowing through the entire bridge and through the consumer. This current is compared to a pregiven maximum value and, when this maximum value is exceeded, the control is reduced to a pulse-duty factor of 1% and is resumed when there is a drop below the pregiven maximum value. A current value is fixed as the maximum current value and this current value is that current which would flow through the bridge when there is a short circuit in the consumer. The known output stage is protected against short circuits because of the reduction of the drive when the threshold value is exceeded. By reducing the drive to a pulse-duty factor of 1%, intense current fluctuations occur in the case of a short circuit when the threshold is exceeded or there is a drop below the threshold which would cause an unsatisfactory performance of the control system.

The mechanics of the control element and the control apparatus electronics must be matched to each other when driving a power control element, especially a throttle flap, with a direct-current motor. In this context, opposing requirements occur. Pregiven maximum displacement times for the power control element are to be maintained and an excess of torque of the drive is to be made available in the case of binding or icing of the control element. The direct-current motor should be held in a pregiven position with the lowest possible current; the smallest peak loads in the vehicle electrical system are to be generated and, finally, the driving output stage should be configured so as to be protected against short circuits and be integratable in a simple manner; that is, the maximum current required by the output stage should be as low as possible.

Not all of these requirements are satisfied in the known output stage which is secure against short circuits. A maximum current up to the short-circuit current is permitted for the known output stage in order to obtain a displacement time which is as short as possible. This also leads to a high excess torque. However, the direct-current motor utilized generates high currents or current peaks when changing the drive control especially during displacement operation during its acceleration and braking. In this way, the electrical system of the motor vehicle is greatly loaded so that large collapses in voltage and drops can be the consequence. Furthermore, a very power intensive output stage, which can only be integrated with difficulty, is required with which corresponding costs are associated.

The known output stage therefore cannot satisfactorily fulfill the opposing requirements made on an output stage for driving a direct-current motor.

If an output stage of lower power would be utilized for controlling the electric consumer or motor, then the known short circuit protection would intervene and quasi switch off the drive for normal displacement as a consequence of current or voltage peaks when driving the consumer or displacing a direct-current motor.

SUMMARY OF THE INVENTION

It is therefore an object of the invention to provide an arrangement for driving a power control element of a drive unit wherein the opposing requirements are satisfied as best as possible and wherein especially the load on the vehicle electrical system is as low as possible without other characteristics of the drive system (especially the necessary displacement time) being significantly affected.

The arrangement of the invention defines a full-bridge output stage for driving a direct-current motor wherein, on the one hand, the ability to withstand short circuits is provided by monitoring the currents through the individual transistors of the output stage with respect to exceeding a maximum short circuit current value and switching off the output stage in the event of a short circuit and, on the other hand, the current through the full-bridge output stage is limited to a pregiven limit value and, in order to limit the current, the pulse-shaped drive signal is so clocked that exceeding the limit value is prevented. This limit value is then in amount less than the peak value of the current peaks, which occur during normal operation during the displacement operation, and is especially less than the switch-on peak and the reverse current peak. Accordingly, the result is then a limiting of the current through the consumer to the pregiven limit value in every operating state and not only in the case of a fault. The limit current is held within narrow limits.

U.S. Pat. No. 4,901,366 discloses that two opposite lying switch elements are actuated in the free-wheeling phase of a full-bridge output stage for driving a power control element of a drive unit.

The above-mentioned opposing requirements are satisfied by the procedure according to the invention.

The opposing requirements are connected in an optimal manner with each other by the procedure of the invention. This is so because the current limiting causes the load on the vehicle electrical system to be held as low as possible during displacement operations without reducing the displacement time significantly. The control element mechanics (gearing, return springs, motor) can be optimized with a view toward displacement time and holding current.

Furthermore, it is advantageous that the output stage itself is not designed with respect to the maximum permissible current of the motor but with respect to the pregiven current limit value. Accordingly, the output stage does not require so much power and is therefore less expensive.

A clear maximum current is pregiven in the area of the output stage and in the electric motor. Accordingly, smaller wire cross sections in the area of the output stage and of the direct-current motor can be selected which likewise reduces costs.

High current peaks during the displacement operation are avoided by the procedure of the invention so that drops in voltage in the control apparatus supply are essentially avoided. The load on the vehicle electrical system is thereby significantly reduced.

Furthermore, it is possible to save cost with respect to the direct-current motor and to design the same smaller.

The procedure of the invention has special significance because of the simple integratibility of the output stage. The integration of the component is only possible because of the use of components of lower power and the limitation of the current flowing through the component as a consequence of reduced power loss. Also, extensive cooling measures for the component are not needed.

The subject matter of the invention is especially significant for guaranteeing operational reliability. Limiting the current through the consumer to the limit value counters fault currents, especially short-circuit currents, which arise because of short circuits flowing through the electric consumer (short circuit toward plus). These measures afford no protection for a short circuit, for example, of a consumer terminal to ground. For this reason, the current through the individual transistors is monitored which, in the case of a fault with the occurrence of a short circuit, transfers the output stage into a safe condition. The reaction comprises, for example, limiting the current through the transistor or switching off the output stage.

BRIEF DESCRIPTION OF THE DRAWINGS

The invention is described below in greater detail with respect to the embodiments shown in the drawing.

DESCRIPTION OF THE PREFERRED EMBODIMENTS OF THE INVENTION

Figure 1:
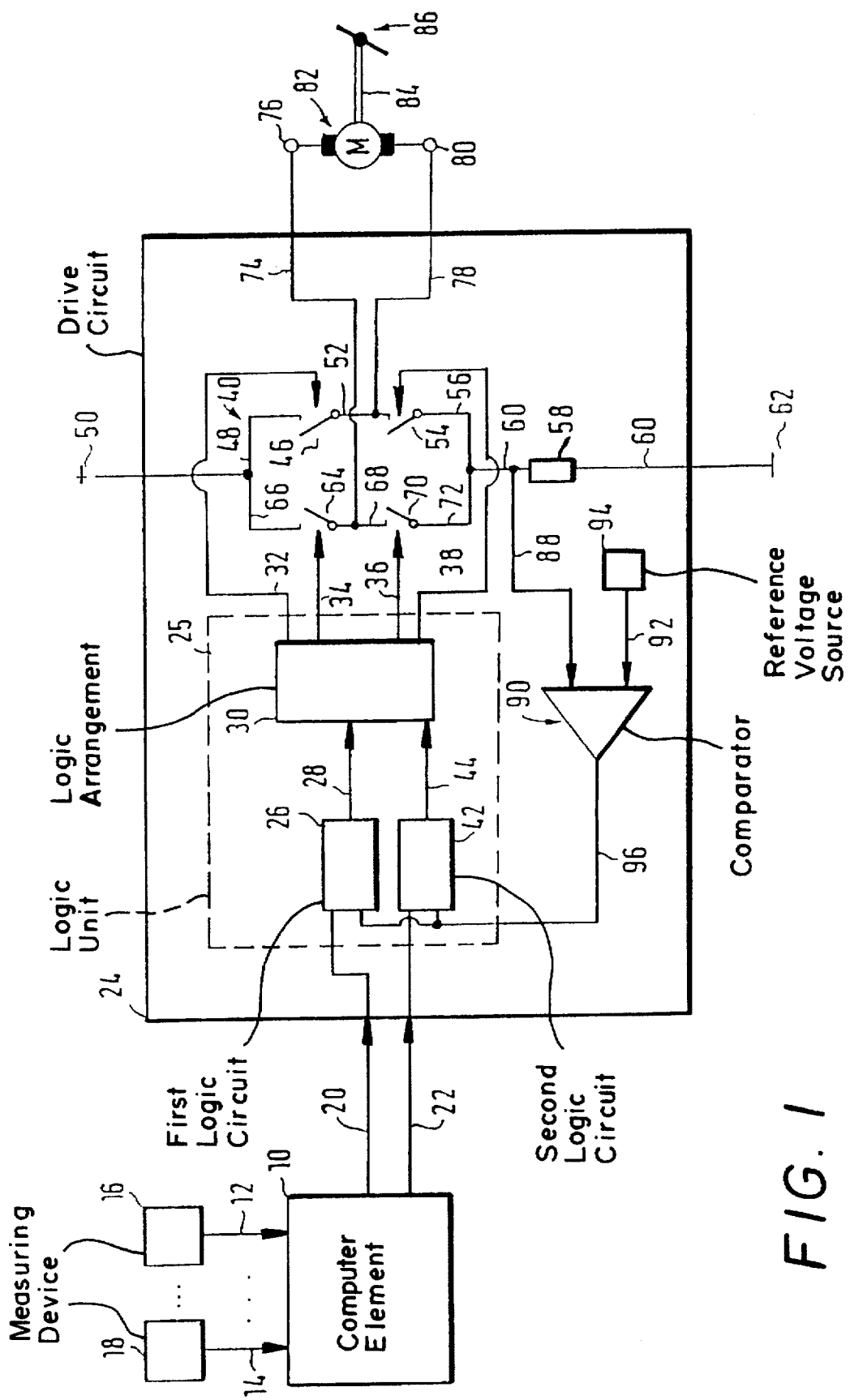
FIG. 1 shows a block circuit diagram of a control system for driving a power control element for which the procedure of the invention is realized.

FIG. 1 shows an overview circuit diagram of a control system for driving a power control element wherein the procedure of the invention is realized. 10 identifies a computer element which has the input lines 12 to 14. These lines connect the computer element 10 to measuring devices 16 to 18. Furthermore, the computer element 10 has output lines 20 and 22 which lead to a drive circuit 24. The output line 20 leads to a logic unit 25 to which lines 22 and 96 are connected. The four output lines 32, 34, 36 and 38 of the logic unit 25 lead to respective switch elements of a fullbridge output stage 40.

In a preferred embodiment, the logic unit 25 includes a first logic circuit 26 to which line 20 is connected and the output line 28 of the logic circuit 26 leads to a logic arrangement 30. The logic unit 25 also includes a second logic circuit 42 to which line 22 is connected and the output line 44 of logic circuit 42 is likewise connected to the logic arrangement 30.

The full-bridge circuit comprises a first switch element 46 to which the line 32 is assigned. The first switch element 46 is connected via line 48 to the positive pole 50 of the operating voltage. On the other hand, the switch element 46 is connected via a line 52 to a second switch element 54 to which the line 38 is assigned. The switch element 54 is connected via the line 56, the measurement resistor 58 as well as the line 60 to the negative pole 62 of the operating voltage. Furthermore, the full-bridge circuit 40 has a third switch element 64 which is connected via the line 66 to the positive pole 50 of the operating voltage and via the line 60 to the fourth switch element 70. The switch element 70 is connected via the line 52, the resistor 58 and the line 60 to the negative pole 62 of the operating voltage. The line 34 is assigned to the switch element 64 and the line 36 is assigned to the switch element 70. A line 74 leads from line 68 to the terminal 76 of the circuit arrangement 24; whereas, a line 78 leads from the line 52 to the terminal 80 of the circuit arrangement 24. The electric motor 82 is preferably a direct-current motor and is connected between the terminal 76 and 80. The direct-current motor is connected via a mechanical connection 84 to the power control element 86 which is especially a throttle flap. A line 88 leads from line 60 to detect the current, which flows through the full-bridge circuit, to the comparator 90. The other input of the comparator is connected to the line 92 and this line 92 connects the comparator 90 to a reference voltage source 94. The output line 96 leads to the logic unit 25 where it is connected to both logic circuits 26 and 42.

The computer element 10 forms output signals for adjusting the power control element or the motor 62 in dependence upon the operating variables detected by the measuring devices 16 to 18. These operating variables are preferably accelerator pedal position, throttle flap position, engine rpm, engine temperature, et cetera. The computer element 10 forms the output signals preferably in the context of a position control. These output signals are outputted to the drive circuit 24 via the line 20 for the first direction of rotation and via the line 22 for the second direction of rotation. The output signals are in the form of pulse-shaped signals and, in the preferred embodiment, the signals are pulsewidth modulated signals. The pulse width determines the duration for which the motor is supplied with current and thereby the adjustment of the power control element. This pulse width modulated signal is conducted over the corresponding line to the first logic circuit 26 and the second logic circuit 42 and is there compared to the logic output signal of the comparator 90. The logic output signal of the comparator 90 is supplied via the line 96 to the logic circuits. The logic circuits 26 or 42 are configured in that the pulsewidth modulated signal is inverted and the inverted pulsewidth modulated signal is coupled to the comparator output signal level via a logic NOR-function. The logic circuit must then satisfy the function that a high signal level is present on the output line 28 or 44 when the pulsewidth modulated pulse signal exhibits a high signal level but with the comparator output signal level being low. In all other cases, the signal on the line 28 or 44 exhibits a low level. Other connections are also advantageous in addition to the above-mentioned realization.

The signal level on the line 96 is formed by comparator 90 by comparing the voltage dropped across measurement resistor 58 to the reference voltage generated by element 94. This reference voltage is so fixed that the voltage value corresponds to a pregiven limit value of the current flowing through the consumer and the bridge. If the voltage across the measurement resistor 58 exceeds the reference voltage value, then this indicates a current exceeding the pregiven limit value. The output signal level of the comparator 90 then changes over to a high level. If the comparator output exhibits a high signal level, then the logic circuits 26 or 42 block a possibly present high signal level of the pulsewidth modulated signal so that the drive is interrupted so long until the comparator again changes its level, that is, the voltage across resistor 58 drops below the reference value.

The logic arrangement 30 receives the signals supplied via the lines 28 or 44 and, in correspondence to the incoming signals, selects the corresponding lines for actuating the switch elements of the full-bridge output stage. For a positive signal level on the line 28, a current flow is triggered in the forward direction in that the elements 64 and 54 are closed via the lines 34 and 38; whereas, for a negative signal level on the line 28, the free running phase is assumed and either all switch elements are opened or, in a preferred embodiment, the switch elements 64 and 46 are closed via the lines 34 and 32 so that the current does not flow back into the vehicle electrical system; instead, the current free runs in the bridge. In a corresponding manner, the logic circuit 30 treats the signals on the line 44. A positive signal level on the line 44 indicates an actuation of the motor in the rearward direction so that, for a current flow phase, the switch elements 70 and 46 are closed via the lines 32 and 36. Here too, the free-running phase is assumed when a low signal level is on the line 44 and all switch elements are opened; or, in the preferred embodiment, the switch elements 64 and 46 are closed so that the current does not flow back into the vehicle electrical system.

If the voltage drop across the measurement resistor 58 exceeds the adjusted value, then the output stage is transferred into the free-running phase and the drive is interrupted so that, finally, the current flowing through the motor 82 is limited to the preadjusted value. As soon as the dropped voltage value drops below the adjusted value then the signal level changes at the output of the comparator so that the output stage is again enabled and the positive signal level of the pulse width modulated signal again becomes effective in supplying the flow of current and the motor is correspondingly actuated.

In addition to the illustrated preferred embodiment, negative logic can be utilized in lieu of the positive logic in other embodiments, that is, the flow of current phase can be triggered by a low level of the drive signal on the lines 20 and 22 and/or on the lines 32, 34, 36 and 38; whereas, the free-running phase is assigned to high signal level. Furthermore, the comparator 90 can have a hysteresis.

Figure 3:
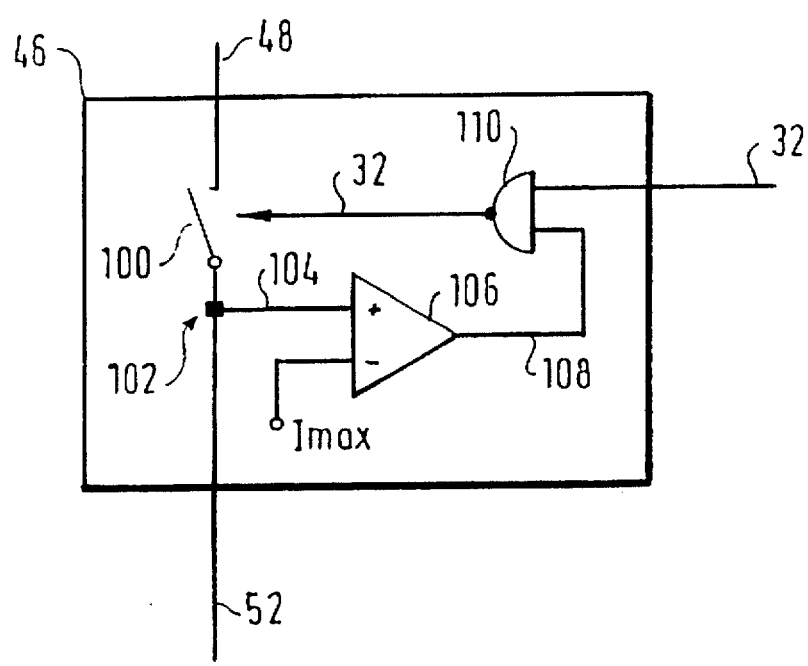
FIG. 3 shows the principle of the short circuit protection of the short-circuit proof output stage.

The principle of the short-circuit protection utilized is shown in FIG. 3. Each of the switch elements 46, 54, 64 and 70 includes means for detecting the current flowing through the circuit elements, respectively (for example, by utilizing so-called current-sensing FETs). If the current flowing through an individual switch element exceeds a short circuit current threshold value, then at least this switch element is switched off. This measure with reference to the short-circuit protection of the output stage is independent of limiting the current flowing through the output stage. This is shown by the example of the switch element 46 having the transistor 100 with current detection 102. The detected current is conducted via a line 104 to a comparator 106. There, the current is compared to the preadjusted current value Imax (the short-circuit current) and an output signal is generated when the detected current exceeds the limit value. The output line 108 of the comparator and the drive line 32 of the switch element 46 are brought together in a NAND-gate 110. The drive of the transistor is interrupted in the case of a short circuit when the short-circuit current value is exceeded. The interaction between this current limiting by the individual switch elements and the current limiting by the entire bridge occurs because the current through the consumer is limited to the limit value when fault currents occur and especially short-circuit currents which occur because of short circuits through the electrical consumer (short circuit to plus). This measure affords no protection, for example, when a consumer is clamped to ground in a short circuit (for example, a short circuit through transistor 64 when control driven). For this reason, the current through the individual transistors is monitored and the output stage is transferred to a safe state in the event of a fault from the occurrence of the short circuit. The reaction, for example, is defined by a limiting of the current through the transistor or in a switchoff of the output stage.

The switch-on and reversing current peaks are capped during a displacement operation with the procedure of the invention of additional current limiting a short-circuit protected output stage. This is achieved without a significant loss on displacement time.

Figure 2:
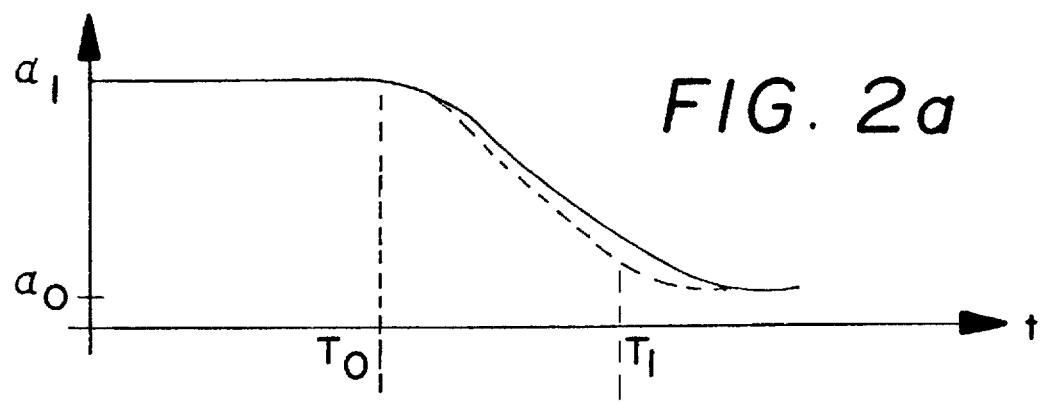
FIG. 2 made up of 2a and 2b shows the operation of the procedure of the invention compared to conventional control systems with the aid of signal traces.
Figure 2:
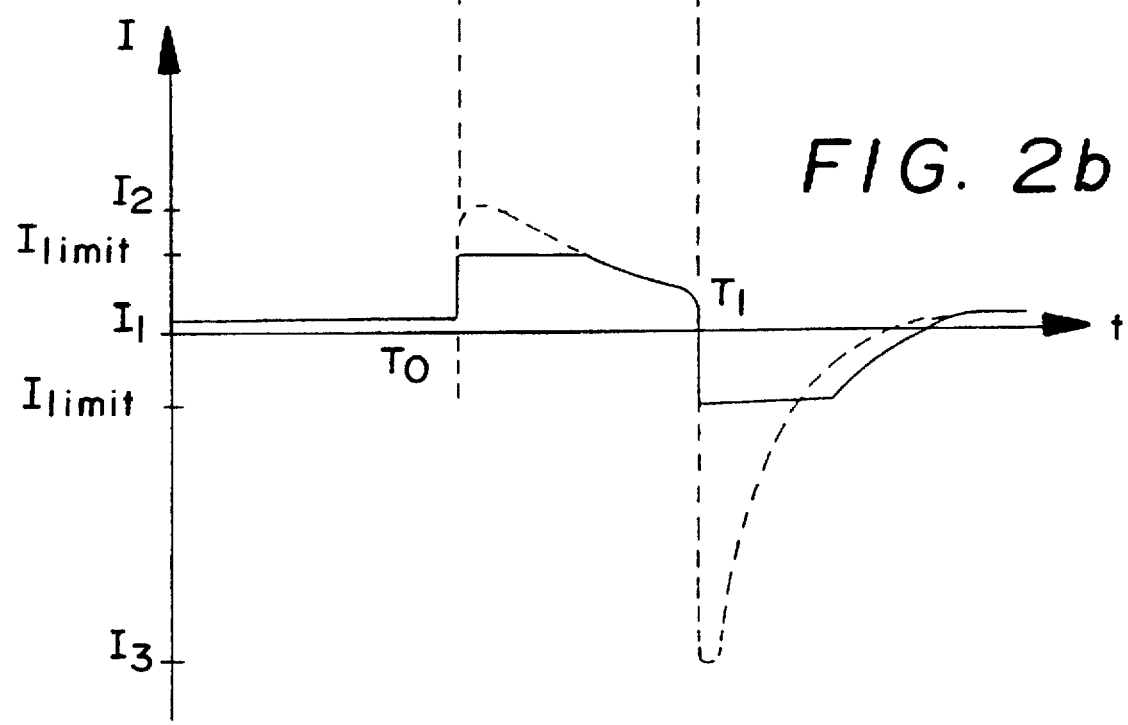

The foregoing is shown with reference to the signal traces in FIG. 2 for the example of controlling a direct-current motor 82 from a first position to a second position. In FIG. 2a, the time is along the horizontal and the position α of the power control element (the throttle flap) is along the vertical. In FIG. 2b, the current flowing through the motor is along the vertical. It is here assumed that the motor is in a position $\alpha_1$ and is held in this position by a current $I_1$. At time point $T_0$, a jump-like change of the drive signal occurs in the sense of a closure of the throttle flap. This causes an abrupt increase in current which, in an embodiment without the invention would have reached the value $I_2$ (shown by broken line). With the invention, this current is limited as shown by the solid line, for example, to 5 A so that the switch-on peak, shown dotted, is avoided. Thereafter, the motor is set in motion so that the current drops until the motor has reached its displacement speed. At time point $T_1$, the motor is braked because it approaches its new position $\alpha_0$. This leads to a counter voltage which, but for the invention, would result in the current peak $I_3$, for example, −15 A. With the procedure of the invention, even this reverse current peak is limited, for example to −5 A or another value. Thereafter, the current slowly assumes the holding current which lies in the range of the previous current value. FIG. 2a clearly shows that the displacement of the motor, which is obtained by the procedure of the invention, departs only insignificantly from the displacement curve shown dotted without the procedure of the invention. A significant reduction of the displacement time cannot be discerned.

In addition to the embodiment shown for the control of a throttle flap, the procedure of the invention can also be utilized in combination with the control of an injection pump lever of a diesel engine.

Furthermore, the comparator 90 can be mounted with measuring resistance 58 and the reference voltage source 94 outside of the output stage component.

Furthermore, the procedure of limiting current according to the invention can also be applied to other circuit realizations of a full-bridge output stage with a drive circuit. Short circuit measures are not shown for reasons of clarity; however, they can of course be realized in the context of the output stage.

In addition to the input of a limiting value for positive and negative currents, two limit values can be provided in an advantageous manner, for example, for displacing the throttle flap into the closed direction, a larger current can be permitted.

The limit values can, in an advantageous manner, also be pregiven in dependence upon operating variables such as engine temperature, coil temperature, ambient temperature, position of the throttle flap, et cetera. For example, and in an advantageous embodiment, the current limitation can be lifted by the computer via a line (not shown) in specific operating situations, for example, when the throttle flap becomes jammed or is frozen tight.

Limiting the current in accordance with the invention is then so configured that, in time average, a current, which corresponds to the predetermined limit value, flows through the consumer and the output stage.

We claim:

1. An apparatus for controlling a power control element of a drive unit of a motor vehicle, the apparatus comprising:
   - an electric motor for controlling said power control element;
   - a source for supplying a current;
   - a full-bridge output circuit connected to said source and to said electric motor for supplying said current to said electric motor;
   - said full-bridge output circuit having four arms;
   - four switching units connected into said four arms, respectively;
   - pulse generating means for generating at least one pulse-shaped drive signal for driving said switching units for allowing said current to flow through said full-bridge output circuit and to said electric motor;
   - limit means for providing a limit value for said current;
   - means for comparing said current to said limit value and for operating on said pulse generating means to inhibit said pulse-shaped drive signal when said current exceeds said limit value and for enabling said pulse generating means when said current drops below said limit value; and,
   - each one of said four switching units including short-circuit monitoring means for monitoring current through said one switching unit and for immediately switching off said full-bridge output circuit when the current through said one switching unit exceeds a predetermined limit value.

2. The apparatus of claim 1, wherein said pulse-shaped drive signal is a pulsewidth modulated signal.

3. The apparatus of claim 2, wherein said motor has two rotational directions and said full-bridge output circuit is driven by said pulse-generating means for the two rotational directions of the motor and a free-running phase.

4. The apparatus of claim 3, further comprising means for interrupting a current flow phase when at least one preadjusted limit value is exceeded during the current flow phase and initiating a free-running phase wherein all of said switching units are opened or two opposite lying switching units are closed.

5. The apparatus of claim 1, wherein said electric motor is a direct-current motor and said current through said direct-current motor can be plotted as a function of time to provide a current trace having a peak value; and, said limit value for said current is less than said peak value in normal operation when said direct-current motor is displaced.

6. The apparatus of claim 1, wherein said current can flow through said motor in a predetermined current direction; and, said limit value of said limit means is pregiven in dependence upon at least one of said current direction and operating variables.

7. The apparatus of claim 1, further comprising: a computer element incorporating means for not considering the limit value of said limit means in predetermined operating situations.

8. The apparatus of claim 1, wherein said comparator means has a hysteresis with reference to the current values between interrupting and resuming the drive of said electric motor.

9. The apparatus of claim 1, wherein said monitoring means in each of said switching units is adapted to compare the current through said one switching unit to a threshold value and at least switch off said one switching unit corresponding thereto when the threshold value is exceeded.

10. The apparatus of claim 1, wherein the full-bridge output circuit is integrated into an output stage component and the limiting of the current is adjusted by external circuits of said full-bridge output circuit.

11. The apparatus of claim 1, further comprising a computer element which includes means for increasing said limit value of said limit means.

* * * * *